United States Patent Office 2,973,615
Patented Mar. 7, 1961

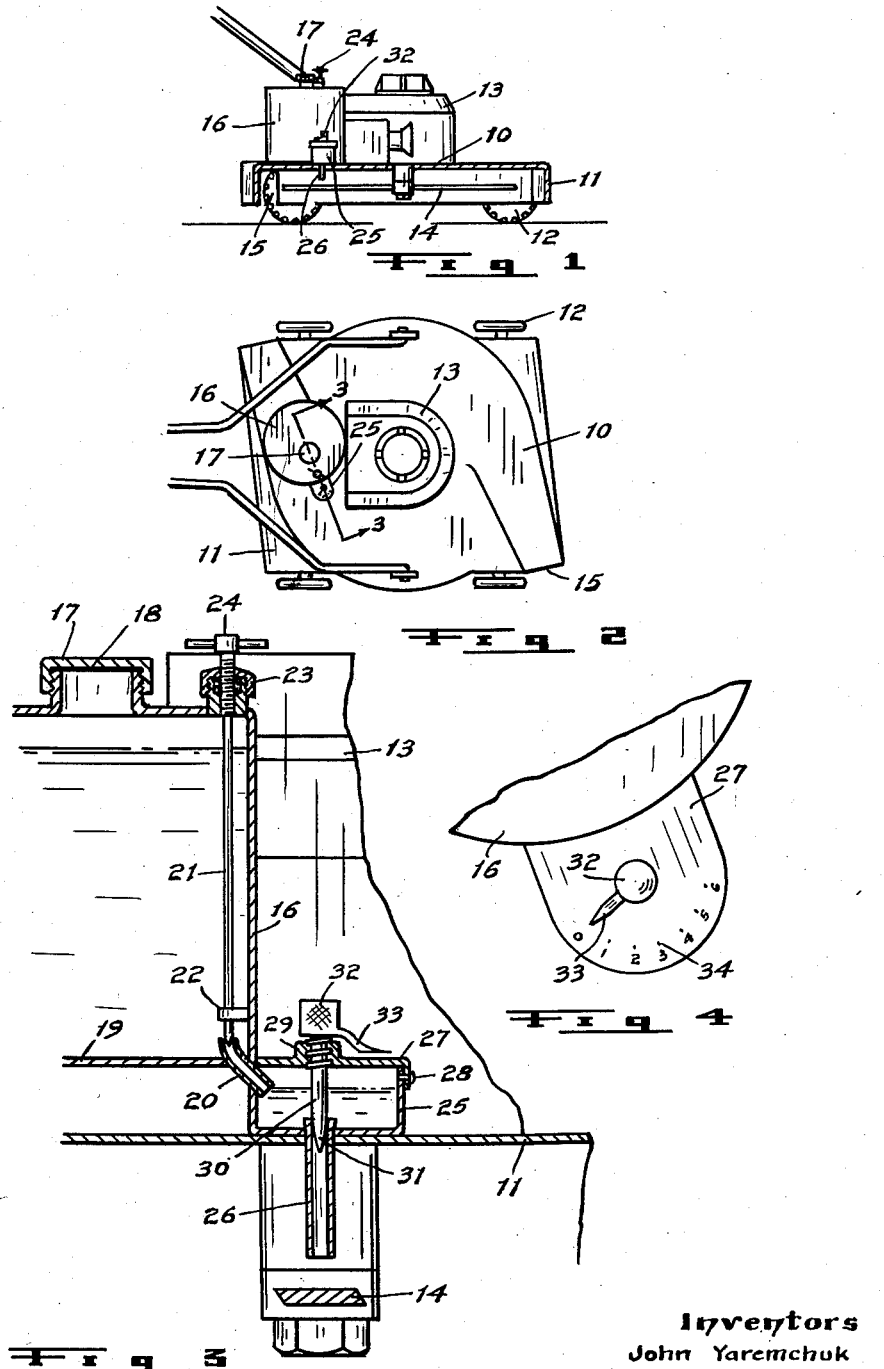

2,973,615
LAWN MOWER WITH WEED SPRAYER
John Yaremchuk and Bernie V. Yaremchuk, both of Group 5, Box 28, R.R. 1, St. Paul, Manitoba, Canada
Filed Dec. 15, 1958, Ser. No. 780,391
1 Claim. (Cl. 56—25.4)

The preferred household method of using weed destroying solutions is to pour the material into a watering can or the like and manually spray same where required from a perforated spout on the can. Various manufactured devices along these lines are sold in the stores, including some constructed for spot delivery to prevent damage to other growth. And of course special power operated machines are used for large areas, such as golf courses, parks and cities for both weed and pest eradication. In these machines the solution is usually power ejected from nozzles.

The disadvantages of these types of weed sprays are: that there is very little actual control of the liquid being sprayed and it is done very wastefully. The spot type of delivery delivers too much liquid in one place. The perforated spout type gives a large circular delivery which too often falls on other tender growth and so causes damage. This is greatly increased if a wind is blowing at the time. The nozzle sprays from power machines do considerable damage in cities as they drive the liquid and vapor considerable distances, under and through fences, into gardens, and so cause more trouble than wind.

The principal objects of the present invention are: to combine a liquid weed eradicating device with a power driven rotary lawn mower; for more perfect distribution of the liquid by the mower blade over the area covered by the machine in its movements; such that the said liquid will be vaporized to a great extent for more effective application to the weeds under the mower; fully protect said liquid and vapor from exterior wind; and so prevent waste and interference with other tender growth; and also provide a big saving of the material as less is required to kill cut weeds.

A further object of the invention is to provide a liquid container for attachment to said mower, said container having a metering valve thereon for regulating the flow of liquid from said container to said mower blade, when operated.

A further object of the invention is to provide means for maintaining a constant pressure on said liquid, irrespective of the level in said container, such that the quantity passing through said valve, for each adjusted position thereof, will be constant.

A further object of the invention is to provide means for shutting off the liquid flow to said mower blade and from said container, when same is to be re-filled.

A still further object of the invention is to construct the attachment in a simple, economical and durable manner, for ease of manufacture and operation, reasonable retail selling price, and years of satisfactory operation.

With the above important and other minor objects in view, which will become more apparent as the description proceeds, the invention consists essentially in the design, construction and arrangement of the parts hereinafter more particularly described, reference being had to the accompanying drawings in which:

Figure 1 is a vertical section through the lower part of a rotary power lawn mower, the upper part thereof being in side view, and showing the invention attached thereon.

Figure 2 is a plan view of the mower and attachment shown in Figure 1.

Figure 3 is an enlarged vertical sectional view taken on the line 3—3, Figure 2.

Figure 4 is a plan view of the metering valve shown in Figure 3.

In the drawings like characters of reference indicate corresponding parts in the several figures.

A power rotary lawn mower is generally indicated by the reference 10 and consists of an inverted pan-shaped casing 11 supported by four wheels 12, one at each corner. A motor 13 is centrally mounted on the top of the casing and drives a horizontal cutting blade 14 thereunder and within the casing. As the mower moves across a lawn, the long grass thereof passes under the casing and is cut by the whirling blade therein, the cuttings passing out the openings 15 provided at two of the corners.

In the present instance, a drum-shaped container 16 is mounted on the upper part of the casing 11, behind the motor, and is provided with an upper removable screw cap 17 which covers a filling opening therein. The cap in turn is provided with a suitable gasket 18, preferably of cork, to assure an air tight connection when the cap is tightened.

The bottom 19 of the container 16 is elevated some distance above the surface of the casing 11 in order that a short drain pipe 20 can pass downwardly from a lower corner thereof. The opening of this drain pipe, within the container, is aligned with and adapted to receive the pointed end of a vertical valve rod 21, the lower end of which is guided in a bracket 22 on the inner wall of the container. The upper end of the valve rod threadedly passes through a packing gland or stuffing box 23 and then is exteriorly provided with a hand control 24 for rotation.

From the above it will be seen that when the hand control is screwed down the valve rod 21 will seat in the drain pipe 20 and cut off the flow from the container. When unscrewed, the container liquid can pass down the drain pipe.

The drain pipe 20 slopes downwardly at an angle and its lower end is adapted to empty into a small sump 25 supported on the casing 11. A delivery pipe 26 passes from the bottom of this sump, down through the top of the casing 11, and terminates just above the path of travel of the cutting blade 14. The top of the sump 25 is closed by an overlapping cover 27 which is secured thereto, as by screws 28, and carries a central upper boss 29. A needle 30 has its lower pointed end 31 in the delivery pipe 26 while its upper end is threaded through the boss 29 and exteriorly provided with a finger grip 32 having a pointer 33 extending therefrom and adapted to swing over a curved series of registrations 34, numbering from 1 to 6 on the cover 27. When the pointer registers with the 0 mark the pointed end of the needle has closed the delivery pipe 26 and when it registers with the other marks, the needle has opened the delivery pipe a corresponding amount depending on the number of the mark, the 6 mark being the fully open position.

When the valve rod 21 is seated in the drain pipe, the screw cap 17 can be removed and the container 16 filled with a weed killer solution, and when the cap is properly replaced the gasket 18 insures an air-tight joint. Accordingly, when the valve rod 21 is released from the drain pipe the solution can only pass therethrough from the container as fast as air bubbles back therethrough to lower the partial vacuum in the container supporting it. When the solution in the sump 25 rises above the bottom of the drain pipe and shuts off this air, no further solution can pass down the drain pipe from the container, and the level in the sump remains constant until the sump starts to drain. In this way, the pressure at the delivery pipe entrance is constant.

The spraying of the solution on the weeds is only done when the power lawn mower is being operated, and is as follows: The operator starts the motor of the mower and then turns the finger grip 32 until the pointer 33 is opposite the registration required, at which time the machine will be moving over the lawn to be cut. The motor drives the cutting blade 14, and as the weed killer solution will be falling from the delivery pipe 26, this solution will be finely sprayed all over the interior area of the mower, free from wind interference, and for contact with all the cut weeds and grass. Some weeds take more solution to kill than others and the length of the grass being cut is another factor as long stems accumulate more solution thereon. The operator must determine the correct amount required for the conditions and set the pointer registration accordingly. As the solution leaves the sump the level therein drops, permitting air to bubble up the drain pipe 20 and let more solution down to maintain the level. This continues until the main container 16 is empty, and then the filling operation takes place as above described.

By maintaining the same level in the sump and the same pressure accordingly at the delivery pipe, the needle 30 actually meters a constant stream of solution down the delivery pipe for each registration position of the pointer and perfect even solution coverage of the lawn is assured. The rotating blade not only delivers the solution all over the mower area of the lawn but breaks the spray up into considerable vapor for fast penetration of the cut weeds. The sides of the mower prevent wind interference and even the cuttings hold the solution thereon to the ground level to prevent contamination of adjacent flowers and shrubs. Wastage is reduced to a minimum and results are assured.

What we claim as our invention is:

A weed sprayer for use with power lawn mowers which include a casing, a source of power on said casing, and a horizontal rotating cutter blade within said casing and rotatable by said source of power; said weed sprayer comprising in combination a container mounted upon the upper side of said casing and in spaced relationship therefrom, a filler opening in said container, a releasable closure cap for said opening normally secured thereto in air-tight connection, a lower sump secured to said casing below the base of said container, an inclined drain pipe extending from the base of said container into said sump, the lower end of said drain pipe terminating above the base of said sump, valve means operably extending between the upper end of said drain pipe and exteriorally of said container, adapted for opening and closing said drain pipe, a delivery tube extending from the base of said sump, through said casing, and terminating adjacent the path of rotation of said cutter blade, and adjustable metering valve means operatively associated with the upper end of said delivery tube and extending externally of said sump for controlling the opening and closing of said delivery tube.

References Cited in the file of this patent

UNITED STATES PATENTS

| | | |
|---|---|---|
| 390,657 | Farrand | Oct. 9, 1888 |
| 1,093,818 | Worley | Apr. 21, 1914 |
| 2,573,784 | Asbury | Nov. 6, 1951 |
| 2,742,751 | Laughlin | Apr. 24, 1956 |
| 2,865,671 | Jensen | Dec. 23, 1958 |

FOREIGN PATENTS

| | | |
|---|---|---|
| 33,232 | Sweden | Sept. 30, 1910 |
| 146,184 | Australia | Apr. 23, 1952 |